(12) United States Patent
Vanajakshi et al.

(10) Patent No.: US 11,689,421 B2
(45) Date of Patent: Jun. 27, 2023

(54) SELECTION OF VIRTUAL PRIVATE NETWORK PROFILES

(71) Applicant: Hewlett Packard Enterprise Development LP, Houston, TX (US)

(72) Inventors: Brundha Srinivasa Vanajakshi, Karnataka (IN); Avanika Agarwal, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/406,749

(22) Filed: Aug. 19, 2021

(65) Prior Publication Data

US 2022/0337480 A1    Oct. 20, 2022

(30) Foreign Application Priority Data

Apr. 19, 2021 (IN) .............................. 202141018084

(51) Int. Cl.
*H04L 41/0823* (2022.01)
*H04L 12/46* (2006.01)
*H04L 41/16* (2022.01)
*H04L 43/0852* (2022.01)
*H04L 9/40* (2022.01)

(52) U.S. Cl.
CPC ...... *H04L 41/0823* (2013.01); *H04L 12/4641* (2013.01); *H04L 41/16* (2013.01); *H04L 43/0852* (2013.01); *H04L 63/0272* (2013.01)

(58) Field of Classification Search
CPC . H04L 41/0823; H04L 41/16; H04L 12/4641; H04L 43/0852; H04L 63/0272
See application file for complete search history.

(56) References Cited

U.S. PATENT DOCUMENTS

| | | | |
|---|---|---|---|
| 7,197,550 B2 | 3/2007 | Cheline et al. | |
| 7,849,505 B2* | 12/2010 | Satterlee | H04L 67/1008 713/153 |
| 9,077,622 B2 | 7/2015 | Tse et al. | |
| 9,813,379 B1* | 11/2017 | Shevade | H04L 63/0272 |
| 10,361,970 B2 | 7/2019 | Beesley et al. | |
| 10,440,058 B2* | 10/2019 | Chen | H04L 67/10 |
| 10,659,255 B1 | 5/2020 | Medamana et al. | |
| 11,134,058 B1* | 9/2021 | Sole | H04W 12/12 |

(Continued)

*Primary Examiner* — Blake J Rubin
(74) *Attorney, Agent, or Firm* — Sheppard Mullin Richter & Hampton LLP (57) ABSTRACT

Examples described herein relate to the selection of virtual private network profiles. A device obtains VPN metrics associated with a plurality of VPN server nodes and monitors device usage metrics. The device is configured with a first VPN profile, which indicates that a first VPN tunnel connection is associated with a first VPN server node from the plurality of VPN server nodes. The device determines a latency associated with each of the plurality of VPN server nodes based on the VPN metrics and the device usage metrics. A second VPN server node associated with a least latency among the plurality of VPN server nodes is selected. A second VPN tunnel connection associated with the second VPN server node is determined based on the device usage metrics. A second VPN profile indicating that the second VPN tunnel connection is associated with the second VPN server node is displayed as a recommendation to a user.

20 Claims, 6 Drawing Sheets

(56) References Cited

U.S. PATENT DOCUMENTS

| | | | | |
|---|---|---|---|---|
| 11,184,328 | B1* | 11/2021 | Hyder | H04L 67/16 |
| 11,245,670 | B1* | 2/2022 | Celiesius | G06F 9/547 |
| 11,310,146 | B1* | 4/2022 | Kaciulis | H04L 63/0272 |
| 11,356,419 | B1* | 6/2022 | Nosalis | G06F 16/252 |
| 2005/0198262 | A1 | 9/2005 | Barry et al. | |
| 2015/0195141 | A1* | 7/2015 | Luft | H04L 67/10 |
| | | | | 709/223 |
| 2016/0234689 | A1* | 8/2016 | Stan | H04L 12/4633 |
| 2016/0253078 | A1* | 9/2016 | Ebtekar | G06T 11/60 |
| | | | | 715/735 |
| 2016/0359811 | A1* | 12/2016 | Chan | H04L 12/6418 |
| 2017/0093904 | A1* | 3/2017 | Ng | H04L 63/20 |
| 2017/0099159 | A1* | 4/2017 | Abraham | H04L 65/102 |
| 2017/0325113 | A1* | 11/2017 | Markopoulou | H04L 63/0272 |
| 2019/0014087 | A1* | 1/2019 | Robinson | H04L 63/0272 |
| 2020/0213360 | A1* | 7/2020 | Ojha | H04L 41/0681 |
| 2020/0409761 | A1* | 12/2020 | Stuntebeck | G06F 9/5027 |
| 2021/0067445 | A1* | 3/2021 | Branch | H04L 45/745 |
| 2021/0099431 | A1* | 4/2021 | Wasicek | G06F 21/6263 |
| 2021/0152578 | A1* | 5/2021 | Alanazi | H04L 63/0421 |
| 2021/0320871 | A1* | 10/2021 | Savarese | H04L 47/20 |
| 2022/0116273 | A1* | 4/2022 | Cunningham | H04L 41/5009 |
| 2022/0174044 | A1* | 6/2022 | Konda | H04L 63/0272 |
| 2022/0174493 | A1* | 6/2022 | Elsins | H04L 12/4641 |
| 2022/0200964 | A1* | 6/2022 | Celiesius | G06F 9/547 |
| 2022/0201086 | A1* | 6/2022 | Celiesius | H04L 12/4641 |
| 2022/0210130 | A1* | 6/2022 | Kaciulis | H04L 63/0876 |
| 2022/0417841 | A1* | 12/2022 | Chak | H04W 12/72 |

* cited by examiner

SELECTION OF VIRTUAL PRIVATE NETWORK PROFILES

BACKGROUND

Virtual Private Network (VPN) establishes a protected network connection across a public network connection, such as the Internet. A VPN provides privacy and security using an intermediary, commonly referred to as a VPN service provider. A VPN service provider may use centralized computing systems, such as VPN servers to ensure online activities are untraceable. The VPN service provider establishes secure connections between the VPN servers and client devices and encrypts traffic originating from the client devices. The VPN servers mask internet protocol (IP) addresses of the client devices before routing the traffic to a public server. Other nodes in the network including Internet Service Providers (ISP) or third parties cannot decipher the encrypted traffic or obtain user data.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. Further, the term "and/or" as used herein refers to and encompasses any and all possible combinations of the associated listed items. It will also be understood that, although the terms first, second, third, fourth, etc., may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

A VPN service provider may deploy multiple VPN servers operating across various geographical locations. Typically, VPN service providers facilitate a connection to the VPN servers through a VPN client application, which may be installed at a client or endpoint device. The VPN client application may provide a plurality of options, i.e., links or uniform resource locators (URLs) for initiating a VPN connection. The options may include a list of VPN servers available for selection, a type of VPN tunnel connections, such as a full tunnel mode, a split tunnel mode, etc.

In a full tunnel VPN connection, each data packet or request originating from the client device is encrypted and directed through the VPN server before reaching a public server. The VPN server may mask the IP addresses or source addresses indicated in the requests before reaching a destination server in the public network. In a split tunnel VPN connection, certain specific requests may travel through the VPN servers and other data packets may bypass the VPN server and directly reach the public server. From the client device perspective, a full tunnel VPN connection may offer higher security compared to a split tunnel connection as each request originating from the client device undergoes the masking operations performed at the VPN server. On the other hand, a split tunnel connection may offer higher speed and may consume less bandwidth because most requests are directly sent to the public network and some specific data packets or requests (e.g., corporate data, financial data, etc.) are directed through the VPN server.

The performance of VPN servers may dynamically change based on various factors including the number of requests, server load, server capacity, bandwidth, response time, etc. Therefore, each VPN server may be operating at different levels of capacity at a given point of time. For example, a VPN server at one geographical region may be overloaded with requests and traffic from a plurality of client devices. The VPN server performance may also be affected by the type of tunnel mode selected at the client devices. For example, a high number of full tunnel mode requests at the VPN server may correlate with high bandwidth consumption and low speed.

Generally, a user of the client device may manually select one of the VPN profiles corresponding to a VPN server and type of tunnel mode for initiating the VPN connection. For instance, the user may arbitrarily select a VPN profile indicating a VPN server and a split tunnel mode. In another instance, the user may select a VPN profile based on a geographical proximity of the VPN server from the client device and a full-tunnel mode. However, client device users may not be aware which VPN server and tunnel mode can provide the best performance in terms of speed and security.

For example, if a user selects full tunnel mode when usage specifications can be met using a split tunnel mode, then the latency associated with the VPN server may increase. Additionally, another client device user attempting to connect using the full tunnel mode may not be able to access the full tunnel connection satisfactorily. Moreover, the selected VPN profile and tunnel mode state remains the same unless the user manually disconnects or a network outage is encountered from the ISP. This may lead to unnecessary and undue usage of a VPN server and a VPN tunnel connection.

To that end, in accordance with aspects of the present disclosure, a solution for selecting virtual private network (VPN) profiles is presented. In some examples, a device obtains VPN metrics associated with a plurality of VPN server nodes. The device monitors device usage metrics associated with the device, which is configured with a first VPN profile. The first VPN profile indicates that a first VPN tunnel connection is associated with a first VPN server node from the plurality of VPN server nodes. The device determines a latency associated with each of the plurality of VPN server nodes based on the VPN metrics and the device usage metrics. A second VPN server node associated with a least latency among the plurality of VPN server nodes is selected. The device determines a second VPN tunnel connection associated with the second VPN server node based on the device usage metrics. The device displays a recommendation for configuring the device with a second VPN profile. The second VPN profile indicates that the second VPN tunnel connection is associated with the second VPN server node.

As will be appreciated, examples presented herein facilitate enhanced selection of VPN profiles. The improved selection of VPN server nodes and associated VPN tunnel connections as effected by various example aspects presented herein, provide high speed and high security connections to user of the client devices with minimal or reduced manual intervention. Automatic and dynamic selection of VPN profiles may enable enhanced performance of the client devices and VPN server nodes (e.g., cluster of VPN servers). Moreover, the prediction of ideal VPN server node and VPN tunnel connection performed at the client devices allows intelligent decision-making capabilities at edge devices, and thereby reducing latency and bandwidth issues in a virtual private network.

Figure 1:
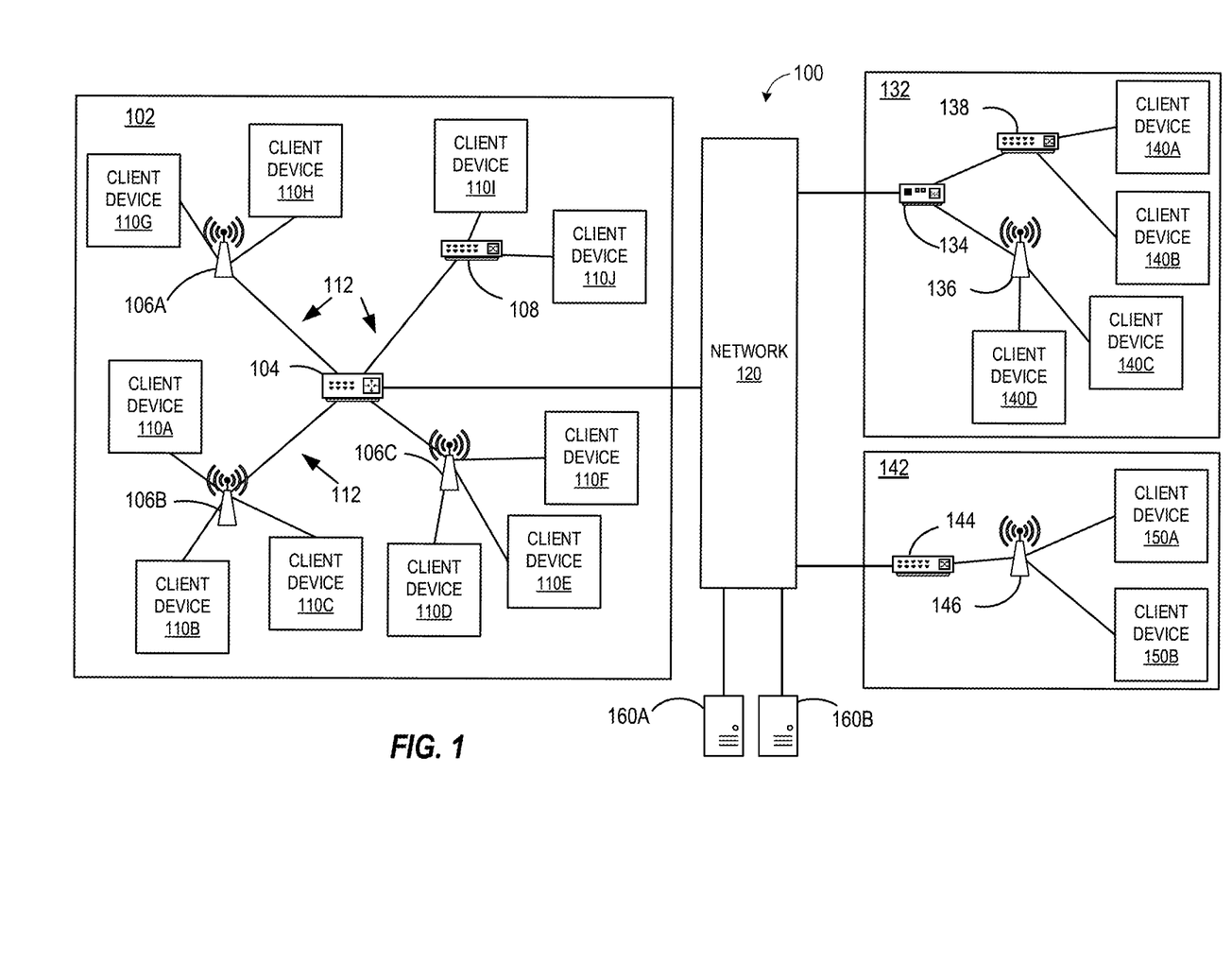
FIG. 1 depicts an example of a network system.

Before describing embodiments of the disclosed devices and methods in detail, it is useful to describe an example network installation with which these devices and methods might be implemented in various applications. FIG. 1 illustrates one example of a networked system 100 that may, for example, be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network system 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. In some examples, the controller 104 may be a hardware, software, or a combination thereof for orchestrating and centralizing the control of the client devices. A single controller 104 is illustrated, though the primary site 102 may include multiple controllers and/or multiple communication points with network 120. In some embodiments, the controller 104 communicates with the network 120 through a router (not illustrated). In other embodiments, the controller 104 provides router functionality to the devices in the primary site 102.

The controller 104 may be operable to configure and manage network devices, such as at the primary site 102, and may also manage network devices at the remote sites 132, 142. The controller 104 may be operable to configure and/or manage switches, routers, access points, and/or client devices connected to a network. The controller 104 may itself be, or provide the functionality of, an access point.

The controller 104 may be in communication with wireless Access Points (APs) 106A-C and/or one or more switches 108. Switches 108 and wireless APs 106A-C provide network connectivity to various client devices 110A-J. Using a connection to a switch 108 or AP 106A-C, a client device 110A-J may access network resources, including other devices on the network (primary site 102) and the network 120.

The client devices 110 may facilitate resources, for example, compute, storage, and/or networking capabilities, for one or more workloads, such as applications, to execute thereon. The client devices 110 may be a device or a system including a processor or microcontroller and/or any other electronic component, or a device or system that may facilitate various compute and/or data storage services. The client devices 110 may have similar or varying hardware and/or software configurations in a given implementation of the network 100. Examples of the client device 110 may include, but are not limited to, a computer appliance, a workstation, a desktop computer, a laptop computer, a smartphone, a smart wearable device, a head mounted display device, mainframes, tablet computers, e-readers, netbook computers, televisions and similar monitors (e.g., smart TVs), content receivers, set-top boxes, personal digital assistants (PDAs), smart terminals, dumb terminals, a server, virtual terminals, video game consoles, virtual assistants, Internet of Things (IOT) devices, and the like. Further, in certain examples, the client device 110 may be a virtual machine or a containerized application executing on hardware in the networked system 100. The client device 110 and its capabilities will be further described in detail with respect to FIG. 2.

Within the primary site 102, a switch 108 is included as one example of a point of access to the network established in primary site 102 for wired client devices 110I-J. Client devices 110I-J may connect to the switch 108 and through the switch 108, may be able to access other devices within the network configuration 100. The client devices 110I-J may also be able to access the network 120, through the switch 108. The client devices 110I-J may communicate with the switch 108 over a wired 112 connection. In the illustrated example, the switch 108 communicates with the controller 104 over a wired 112 connection, though this connection may also be wireless.

Wireless APs 106A-C are included as another example of a point of access to the network established in primary site 102 for client devices 110A-H. The APs 106A-C may control network access of the client devices 110A-H and may authenticate the client devices 110A-H for connecting to the APs and through the APs, to other devices within the network configuration 100. Each of APs 106A-C may be a combination of hardware, software, and/or firmware that is configured to provide wireless network connectivity to wireless client devices 110A-H. In the illustrated example, APs 106A-C can be managed and configured by the controller 104. APs 106A-C communicate with the controller 104 and the network over connections 112, which may be either wired or wireless interfaces.

The network configuration 100 may include one or more remote sites 132. A remote site 132 may be located at a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140A-D.

In various embodiments, the remote site 132 may be in direct communication with primary site 102, such that client devices 140A-D at the remote site 132 access the network resources at the primary site 102 as if these clients devices 140A-D were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150A-B access the network 120. Such a remote site 142 may represent, for example, an individual employee's home or a temporary remote office. The remote site 142 may also be in communication with the primary site 102, such that the client devices 150A-B at remote site 142 access network resources at the primary site 102 as if these client devices 150A-B were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 132 to 142 as well as access to servers 160A-B. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160A-B. Content servers 160A-B may include various providers of multimedia downloadable and/or streaming content, including audio, video, graphical, and/or text content, or any combination thereof. Examples of content servers 160A-B include, for example, web servers, streaming radio and video providers, and cable and satellite television providers. The client devices 110A-J, 140A-D, 150A-B may request and access the multimedia content provided by the content servers 160A-B.

Figure 2:
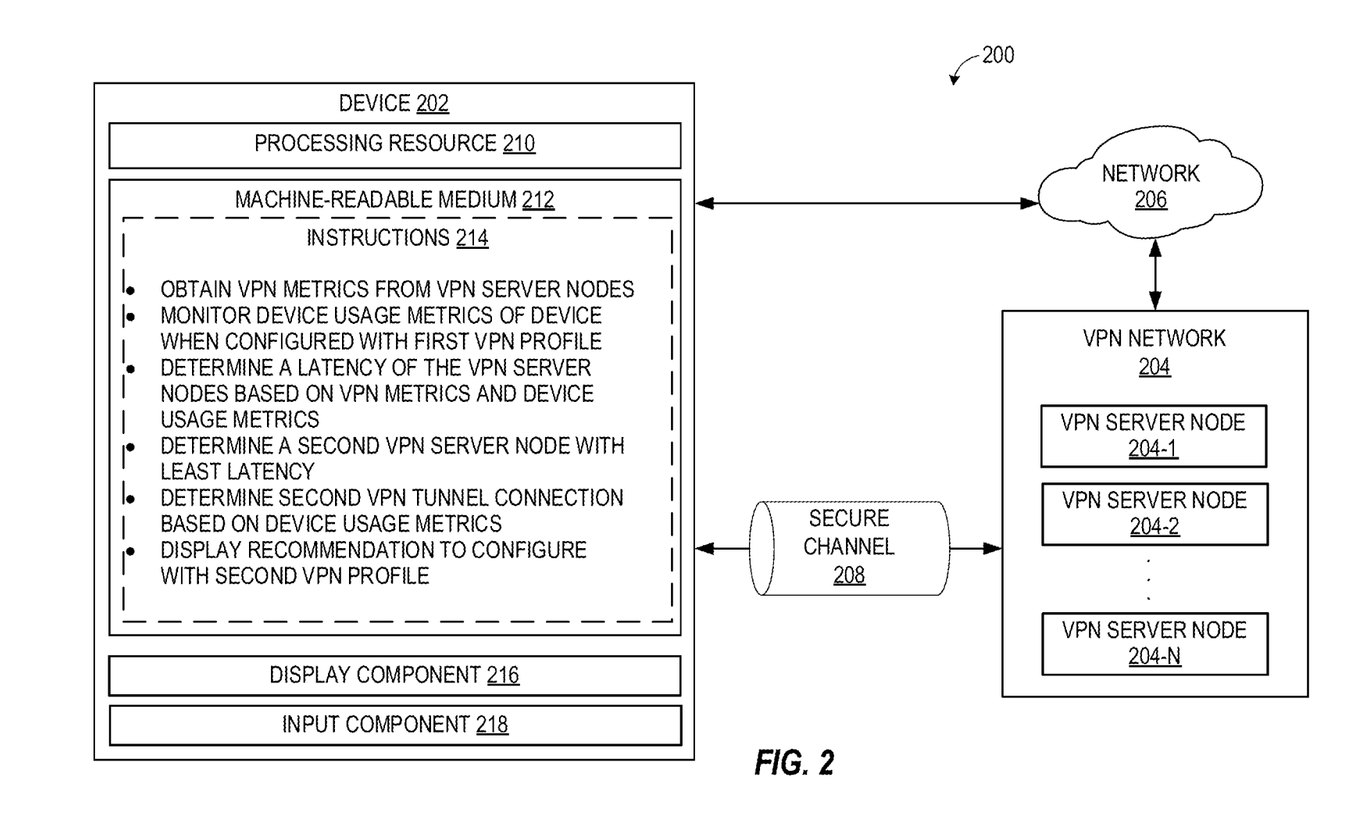
FIG. 2 depicts an example of a network system for selecting virtual private network profiles.

Further, the network 120 may include a virtual private network (VPN) providing a secure communication to the client devices 110 when accessing external networks, such as the public networks. FIG. 2 depicts a networked system 200 including a client device 202, a virtual private network 204 and a public network 206. The networked system 200 may facilitate selection of virtual private network profiles, in accordance with an example. The virtual private network 204 and the public network 206 may be part of a network, such as a network 120 of FIG. 1. In FIG. 2, although the networked system 200 is shown to include one device 202, the networked system 200 may include any number of client devices, without limiting the scope of the present disclosure. The device 202 may include any of the client devices 110, sites 102, 132, or 142, or their components, as described with respect to FIG. 1. The device 202 may hereinafter also be referred to as client device 202 or a processor-based system 202.

The device 202 may be coupled to the virtual private network 204 via a secure connection facilitating communication of encrypted data. The VPN network 204 may include a plurality of VPN server nodes 204-1, 204-2, . . . , 204-N, which may, in some examples, be located at physical different locations (e.g., on different racks, on different enclosures, in different buildings, in different cities, in different countries, and the like). Although a limited number of VPN server nodes 204-1, 204-2, . . . 204-N is shown, the networked system 200 may include any number of VPN server nodes located in different geographical locations, without limiting the scope of the present disclosure. In some examples, the plurality of VPN server nodes 204-1, 204-2, . . . 204-N may be co-located. The plurality of VPN server nodes 204-1, 204-2, . . . 204-N may hereinafter collectively be referred to as VPN servers 204, server nodes 204 or the virtual private network 204. In some examples, the plurality of VPN server nodes 204 may facilitate storage and networking capabilities, for establishing secure communication channels with client devices 202. Alternatively, in other examples, the VPN server nodes may also facilitate compute capabilities for performing encryption operations, decryption operations, IP address masking operations, and the like. Examples of the plurality of VPN server nodes 204 may include, but are not limited to, a server, clusters of servers, Virtual Private Network (VPN) servers, web servers, authentication servers, authentication-authorization-accounting (AAA) servers, Domain Name System (DNS) servers, Dynamic Host Configuration Protocol (DHCP) servers, network policy servers. By way of example, while some VPN server nodes 204 may have high-end compute capabilities, some server nodes may facilitate strong data security, and certain nodes may have enhanced thermal capabilities.

The network 206 may include a network of varying size that may not be secure. Examples of the network 206 may be public or private networks including, but not limited to, an Internet Protocol (IP) or non-IP-based local area network (LAN), wireless LAN (WLAN), metropolitan area network (MAN), wide area network (WAN), a storage area network (SAN), a personal area network (PAN), a cellular communication network, a Public Switched Telephone Network (PSTN), and the Internet. Communication over the network 206 may be performed in accordance with various communication protocols such as, but not limited to, Transmission Control Protocol and Internet Protocol (TCP/IP), User Datagram Protocol (UDP), IEEE 802.11, and/or cellular communication protocols. The communication over the network 206 may be enabled via a wired (e.g., copper, optical communication, etc.) or wireless communication technologies. In some examples, the network 206 may be enabled via private communication links including, but not limited to, communication links established via wireless, wired (e.g., copper), and the like.

Further, the device 202 and the VPN server node 204 may be connected using private communication links, which may be direct communication links between the device 202 and the plurality of VPN server nodes 204. In some examples, the VPN server node 204 may provide a secure connection to the device 202 by implementing secure channel or tunneling protocols including, but not limited to, IP security (IP Sec), Transport Layer Security (TLS), Secure Shell (SSH), Datagram Transport Layer Security (DTLS), Multi Path Virtual Private Network (MPVPN), Secure Socket Tunneling Protocol (SSTP), Point-to-Point Tunneling Protocols, and the like. The tunneling protocols may facilitate a tunnel mode operation, which establishes a secure channel 208 for transfer of data packets originating from and received by the device 202. The secure channel 208 allows transfer of data packets after an encryption and authentication process. For instance, the encryption may be performed using symmetric-key methods and public key methods. Symmetric key methods may include, but not limited to, Advanced Encryption Standard (AES), Twofish, Serpent, Rivest Cipher 4 (RC4), Data Encryption Standard (DES), and the like. Public key methods may include Rivest-Shamir-Adleman (RSA), Diffie-Hellman key exchange, Digital Signature Algorithm (DSA), and the like.

In some examples, the client device 202 may include a processing resource 210 and a machine-readable medium 212. The machine-readable medium 212 may be any electronic, magnetic, optical, or other physical storage device that may store data and/or executable instructions 214. For example, the machine-readable medium 212 may include one or more of a Random Access Memory (RAM), an Electrically Erasable Programmable Read-Only Memory (EEPROM), a storage drive, a flash memory, a Compact Disc Read Only Memory (CD-ROM), and the like. The machine-readable medium 212 may be non-transitory. As described in detail herein, the machine-readable medium 212 may be encoded with the executable instructions 214 to perform one or more methods, for example, methods described in FIGS. 3, 4, and 5.

Further, the processing resource 210 may be a physical device, for example, one or more central processing unit (CPU), one or more semiconductor-based microprocessors, one or more graphics processing unit (GPU), application-specific integrated circuit (ASIC), a field programmable gate array (FPGA), other hardware devices capable of retrieving and executing instructions 214 stored in the machine-readable medium 212, or combinations thereof. The processing resource 210 may fetch, decode, and execute the instructions 214 stored in the machine-readable medium 212 to select a virtual private network profile (described further below). As an alternative or in addition to executing the instructions 214, the processing resource 210 may include at least one integrated circuit (IC), control logic, electronic circuits, or combinations thereof that include a number of electronic components for performing the functionalities intended to be performed by the device 202. Moreover, in certain examples, where the device 202 may be a virtual machine or a containerized application, the processing resource 210 and the machine-readable medium 212 may represent a processing resource and a machine-readable medium of the hardware or a computing system that hosts the device 202 as the virtual machine or the containerized application.

During operation of the device 202, the processing resource 210 may obtain virtual private network (VPN) metrics associated with a plurality of VPN server nodes 204. In some examples, the VPN metrics may include roundtrip time (RTT), routing hops, throughput, server load, queue length, number of disconnections, response time, etc., associated with each server node in the plurality of VPN server nodes 204. RTT may refer to the total time taken for a request to travel from a device 202 to a VPN server node and return to the device 202. Routing hops may refer to the number of network devices a data packet travels through before reaching a destination server. Throughput may refer to the number of requests processed at a VPN server node. Server load may refer to measurement of resource utilization, such as CPU utilization, memory utilization, disk utilization, etc. Queue length may refer to number of processes waiting in queue to access a VPN server resource. The number of disconnections may refer to a frequency of disconnections between a device 202 and a VPN server node 204. Further, response time may include time delay between a VPN server node and public server in the network 206 and/or the time delay between the VPN server node 202 and the device 202.

The processing resource 210 may monitor device usage metrics associated with the device 202 configured with a first VPN profile. The first VPN profile may indicate that a first VPN tunnel connection is associated with a first VPN server node from the plurality of VPN server nodes 204. The first VPN tunnel connection may be a split tunnel connection, a full tunnel connection, or any other connection for accessing web pages on server, such as public server, private server, or a hybrid server. The secure channel 208 may facilitate the VPN tunnel connections between the device 202 and the VPN server node 204. In some examples, the secure channel 208 may provide a full tunnel VPN connection, which ensures the traffic originating from the device 202 are encrypted and travel through the VPN server node 204 before reaching the public network 206. In some examples, the secure channel 208 may facilitate a split tunnel VPN connection, wherein a predetermined traffic travels through the VPN server node 204 and remaining traffic travels directly to the public network 206. For example, the predetermined traffic may include data packets or requests associated with confidential data, such as corporate data, financial data, personal data, and the like.

In some examples, the device usage metrics may include device profile, historical traffic data, device activity status, user specific metrics, workload profiles, tunnel connection traffic, device resources, etc. The device profile may indicate whether the device is a newly added network device (i.e., a greenfield deployment) or an existing network device (i.e., a non-greenfield deployment). Historical traffic data may refer to web traffic, browsing history, downloads, web cookies, bookmarks, etc. Device activity status may indicate whether the device is active or inactive. User-specific metrics may include frequently used VPN profiles, working hours, user's time zone, and the like. The tunnel connection traffic may indicate the type of traffic (split-tunnel traffic or full tunnel traffic) communicated over a given tunnel connection. Further, the workload profile may include information about the various workloads, such as applications, running on the device that are using a VPN connection. The device resources may include type of uplink connection, such as broadband, cellular, etc., or device specifications, such as processor, memory, or network resources, etc.

Further, the processing resource 210 may determine a latency associated with each of the plurality of VPN server nodes based on the VPN metrics and/or the device usage metrics. Latency may refer to a delay associated with data packets to reach a destination server, such as a VPN server node. The delay may be caused due to various factors including, but not limited to, processing of data packets, transmission of data packets on a communication link, queueing of data packets, etc. In some examples, latency associated with a VPN server node may be impacted by the VPN metrics and the device usage metrics.

The processing resource 210 may select a second VPN server node associated with a least latency among the plurality of VPN server nodes 204. In some examples, the second VPN server node may be associated with one or more of least latency, high throughput, low server load, etc. The processing resource 210 may determine a second VPN tunnel connection associated with the second VPN server node based on the device usage metrics. The second VPN tunnel connection may be a split tunnel connection or a full tunnel connection. The processing resource 210 may display a recommendation to configure the device 202 with the second VPN profile. The second VPN profile may indicate that the second VPN tunnel connection is associated with the second VPN server node. In some examples, the recommendation may be displayed for a predetermined period.

In some examples, the processing resource 210 may execute a VPN client workload installed on the device 202. The VPN client workload may be an application or machine-executable instruction set associated with the VPN server node 204. The VPN client workload may provide a plurality of VPN profiles as options for connecting to a VPN server node on a VPN tunnel connection. In some examples, the VPN profiles may be rendered on a graphical user interface. In some examples, the device 202 may include a display component 216 and an input component 218. The display component 216 may display the recommended VPN profiles as one or more options for user selection. The display component 216 may be, for example, a type of Light Emitting Diode (LED) display, a type of Liquid Crystal Display (LCD), etc. The input component 218 may be a touch screen that is positioned over the display component 216. The touch screen may be integrated with the display component 216 or, alternatively, the touch screen may be a separate component. In some examples, the input component 218 may also include keyboards, mouse, cameras, microphones, speakers, printers, scanners, and/or the like. The input component 218 may be integrated with the device 202 or they may be peripheral components. In some cases, the input component 218 may be connected to the device 202 through wired connections (e.g., cables/ports). In other cases, the input component 218 may be connected to the device 202 through wireless connections.

In some examples, the processing resource 210 may dynamically switch from the first VPN profile to the second VPN profile. In some examples, dynamic switching may include disconnecting from the first VPN server node and the first VPN tunnel connection responsive to expiry of the predetermined period after displaying the recommendation. Further, a connection with the second VPN server node and the second VPN tunnel connection may be established. In some examples, if a user does not select the recommended VPN profile for the predetermined period, the processing resource 210 may automatically switch the VPN profile. In some examples, the processing resource 210 may disconnect the connection to the second VPN server based on one or more device usage metrics. For instance, the disconnection may be performed based on device inactivity or a time-zone of the user.

Figure 3:
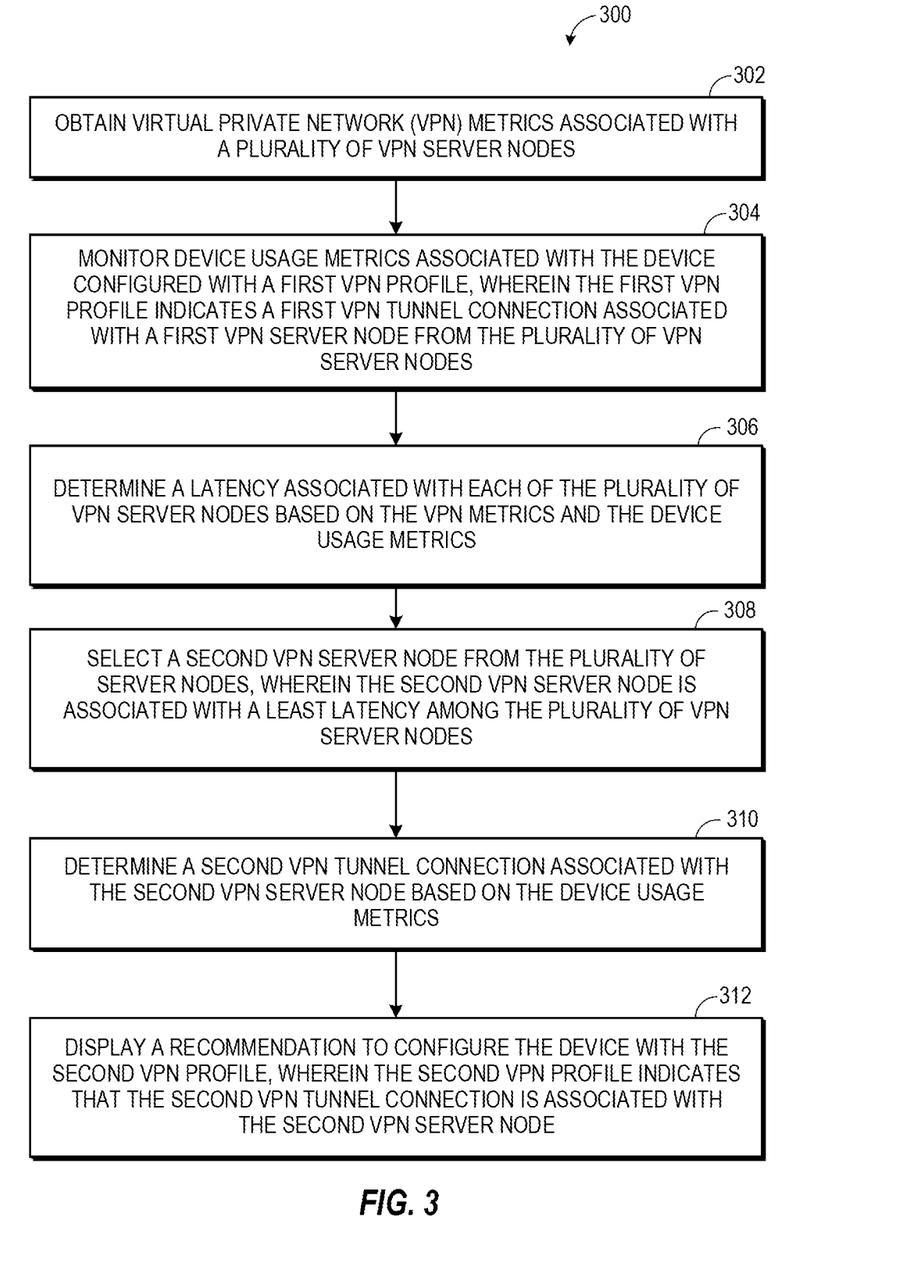
FIG. 3 is a flow diagram depicting a method for selecting virtual private network profiles, in accordance with an example.

Referring now to FIG. 3, a flow diagram depicting a method 300 for selecting VPN profiles is presented, in accordance with an example. For illustration purposes, the method 300 will be described in conjunction with the networked system 200 of FIG. 2. The method 300 may include method blocks 302, 304, 306, 308, 310, and 312 (hereinafter collectively referred to as blocks 302-312) which may be performed by a processor-based system such as, for example, device 202. In particular, the operations at each of the method blocks 302-312 may be performed, for example, by the processing resource 210 by executing the instructions 214 stored in the machine-readable medium 212 (see FIG. 2). Moreover, it is to be noted that in some examples, the order of execution of the blocks 302-312 may be different than shown in FIG. 3. For example, the blocks 302-312 may be performed in series, in parallel, or a series-parallel combination. Although execution of method 300 is described below with reference to device 202 or processing resource 210 of FIG. 2, this is for explanatory purposes and other suitable components for execution of method 300 may be utilized.

At block 302, the processing resource 210 may collect virtual private network metrics associated with a plurality of virtual private network server nodes 204. In some examples, the virtual private network metrics may be obtained from the plurality of VPN server nodes at periodic intervals. At block 304, the processing resource 210 may monitor device usage metrics associated with the device configured with a first VPN profile. In some examples, the device usage metrics may be monitored using a client tracking workload installed on the device 202. For instance, the client tracking workload may track historical traffic data, device activity status, user-specific metrics, workload profiles, device resources, and the like. In some examples, the device usage metrics may be collected and stored in a local storage, such as in memory unit of the device 202, or in a local database coupled to the device 202 via a local network. Alternatively, the device usage metrics may be stored in a remote database, such as in a public cloud.

At block 306, the processing resource 210 may determine a latency associated with each of the plurality of VPN server nodes based on the VPN metrics and the device usage metrics. At block 308, the processing resource 210 may select a second VPN server node associated with a least latency among the plurality of VPN server nodes 204. At block 310, the processing resource 210 may determine a second VPN tunnel connection associated with the second VPN server node based on the device usage metrics. In some examples, the second VPN tunnel connection may be determined based on the device usage metrics, such as historical web traffic, tunnel connection traffic, or user specific metrics. The historical web traffic may include the web pages visited or downloaded. The user specific metrics may include time zone of user, working hours of user, user privileges to access restricted websites, and the like. The tunnel connection traffic may indicate whether a split tunnel traffic or full tunnel traffic is communicated over the first VPN tunnel connection. Split tunnel traffic may refer to traffic communicated over a split tunnel VPN connection and a full tunnel traffic may refer to traffic communicated over a full tunnel connection. For example, if the first VPN tunnel connection is a full tunnel VPN connection, and a split tunnel traffic is communicated over the first VPN tunnel connection, then the processing resource 210 may determine a second VPN tunnel connection supporting split tunnel VPN connection.

At block 312, the processing resource 210 may display a recommendation to configure the device with a second VPN profile, which indicates that the second VPN tunnel connection is associated with the second VPN server node. In some examples, the recommendation may be displayed on a display unit as a user interface rendering a plurality of options, which indicate VPN profiles. In some examples, the recommendation may be displayed for a predetermined period. On expiry of the predetermined period, if the second VPN profile is not selected, the processing resource 210 may automatically switch from the first VPN profile to the second VPN profile.

Figure 4:
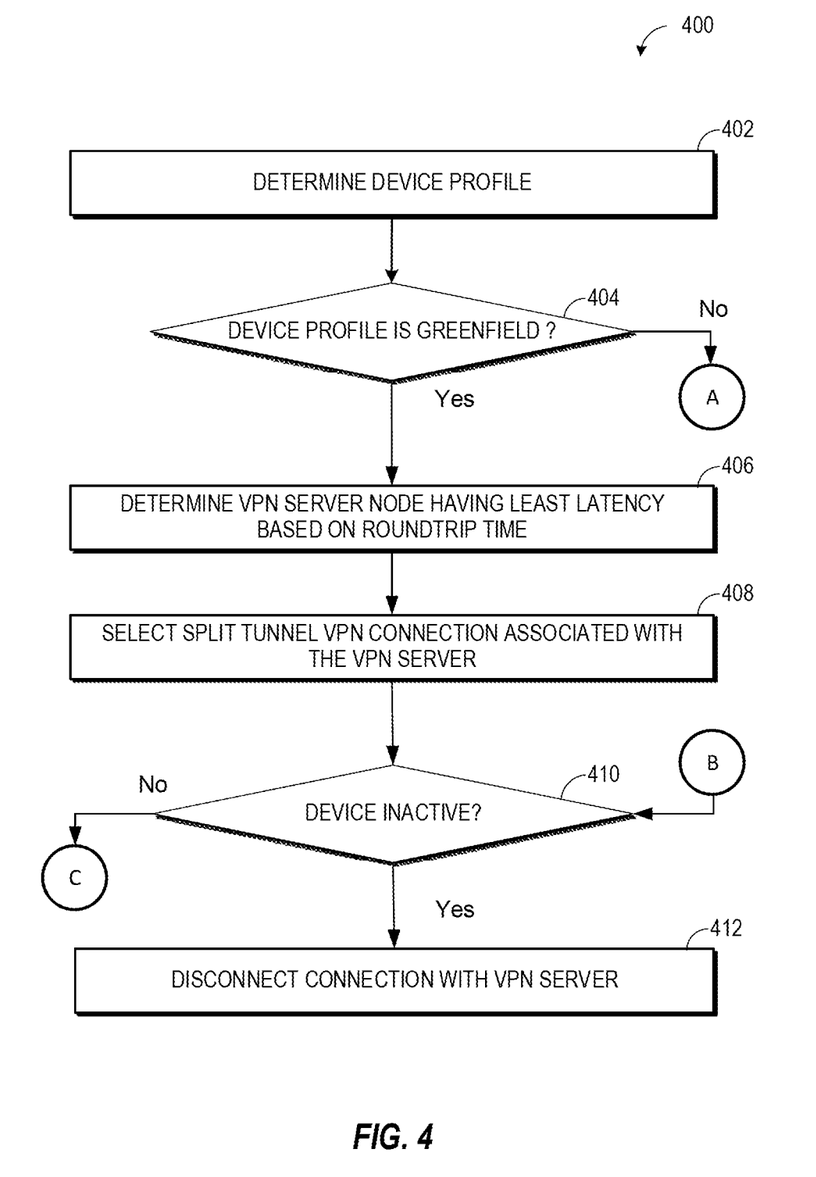
FIG. 4 is a flow diagram depicting a method for selecting virtual private network profiles in a greenfield deployment device, in accordance with another example.
Figure 5:
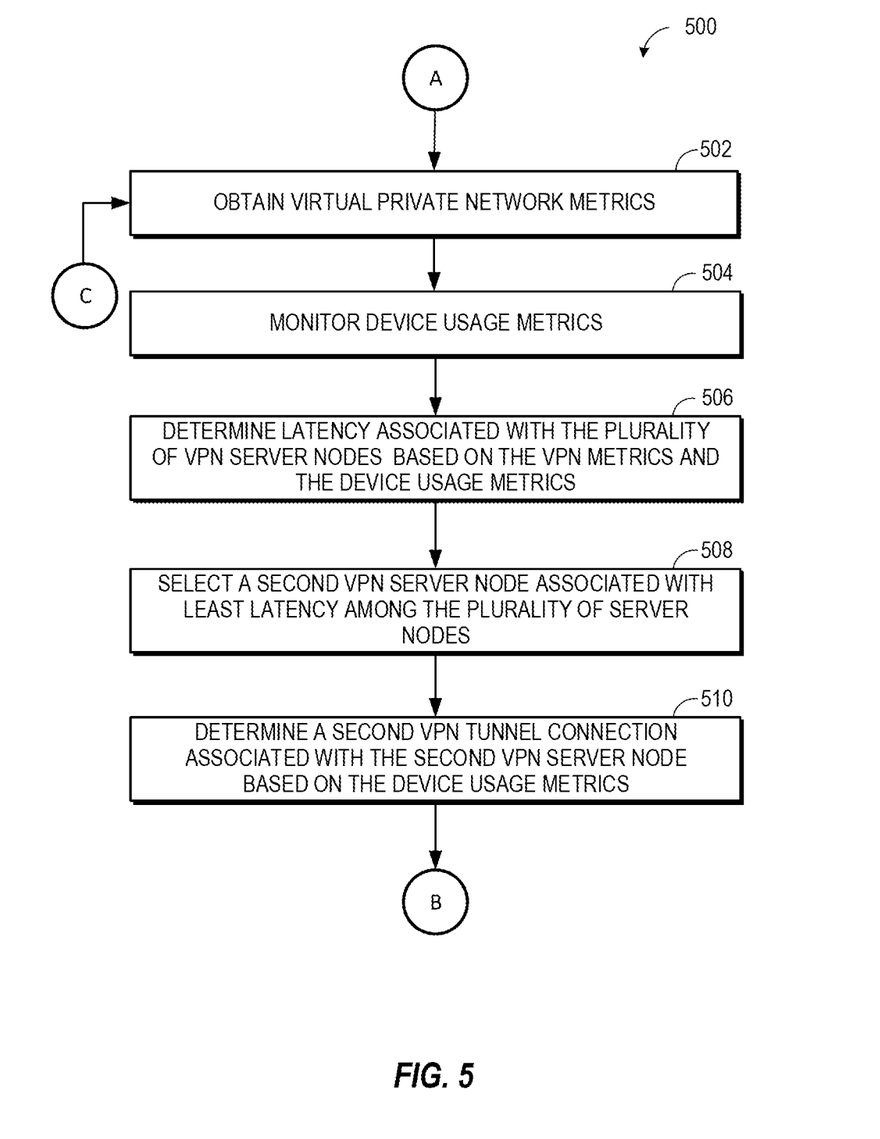
FIG. 5 is a flow diagram depicting a method for selecting virtual private network profiles in a non-greenfield deployment device, in accordance with another example.

FIGS. 4 and 5 are flow diagrams depicting a method for selecting a virtual private network profile based on device profile, in accordance with another example. In FIG. 4, the method 400 depicts a selection of a VPN profile for a greenfield deployment device. At block 402, the processing resource 210 may determine a device profile of the device 202. In some examples, the device profile may indicate whether the device is a greenfield deployment (i.e., new device in the network) or a non-greenfield deployment (existing device in the network). The processing resource 210 may check a VPN configuration history and/or logs indicating the prior VPN profiles used by the device 202. The VPN configuration history may be stored locally at a device memory. At block 404, the processing resource may determine whether the device is a greenfield or non-greenfield deployment device based on the VPN configuration history. For example, a greenfield deployment device may not have a VPN configuration history and a non-greenfield deployment device may have a VPN configuration history.

For a greenfield deployment device, the processing resource 210 may determine a VPN server node having a least latency among the plurality of VPN server nodes 204 at block 406. In some examples, the processing resource 210 may obtain a network metric, such as round-trip time or delay from the plurality of VPN server nodes to determine latency for each server node. In some examples, the processing resource 210 may select a predetermined VPN tunnel connection, such as a split tunnel VPN connection, for greenfield deployment device at block 408. At block 410, the processing resource 210 may check if the device is inactive. If the device is inactive, then the processing resource 210 may disconnect the connection to the VPN server and the first VPN profile, at block 412. In some examples, the processing resource 210 may disconnect the VPN tunnel connection if the device is inactive and preserve the connection to the VPN server. In some examples, if the device is not inactive at block 410, the processing resource 210 may perform the method blocks 502-510.

In FIG. 5, the flow diagram depicts a method 500 for selecting VPN profiles for a non-greenfield deployment device. At block 502, the processing resource 210 may obtain virtual private network metrics (VPN) from the plurality of virtual private network server nodes 204. In some examples, the VPN metrics may include roundtrip time (RTT), routing hops, throughput, server load, queue length, number of disconnections, response time, etc., associated with each server node in the plurality of VPN server nodes 204. At block 504, the processing resource 210 may monitor device usage metrics at the device 202. The device usage metrics may include historical traffic data, device activity status, user-specific metrics, workload profiles, routing and other usage patterns, and the like. At block 506, the processing resource 210 may determine a latency associated with the plurality of VPN server nodes based on the VPN metrics and the device usage metrics.

At block 508, the processing resource 210 may select a second VPN server node associated with a least latency from the plurality of VPN server nodes. In some examples, determining the second VPN server node may include providing the VPN metrics and the device usage metrics as an input to a machine learning model. The machine learning model may be deployed on the device 202 for predicting a VPN server node having the least latency. The machine learning model may be trained using learning methods from supervised learning, unsupervised learning, semi-supervised learning or reinforcement learning techniques. Examples of learning methods may include, but not limited to, random forest, neural networks, linear regression, logistic regression, linear discriminant analysis, support vector machines, decision tree, linear SVM, naïve bayes, hierarchical clustering, k-means, anomaly detection, and the like. The machine learning model may be trained using historically stored virtual private network metrics and device usage metrics. In some examples, the device 202 may store historical virtual private network metrics and device usage metrics at a local database or access the metrics from a remote database. In some examples, the historical data associated with virtual private network metrics and device usage metrics may be categorized into a training dataset, a validation dataset, and a testing dataset. The training dataset may be used for training the learning model, the validation dataset may be used for fine-tuning the model, and the testing dataset may be used for testing the performance of the machine learning model. In some examples, the trained machine learning model may receive VPN metrics from the plurality of VPN server nodes and the device usage metrics in real time. The real time data may be provided as input to the trained machine learning model. The model predicts the VPN server node using the input based on the training. At block 510, the processing resource 210 may determine a second VPN tunnel connection associated with the second VPN server node based on the device usage metrics. In some examples, the device usage metrics may be used to determine device activity status, i.e., whether device is active or inactive. The processing resource 210 may check the device inactivity periodically as indicated in block 410 of FIG. 4.

Figure 6:
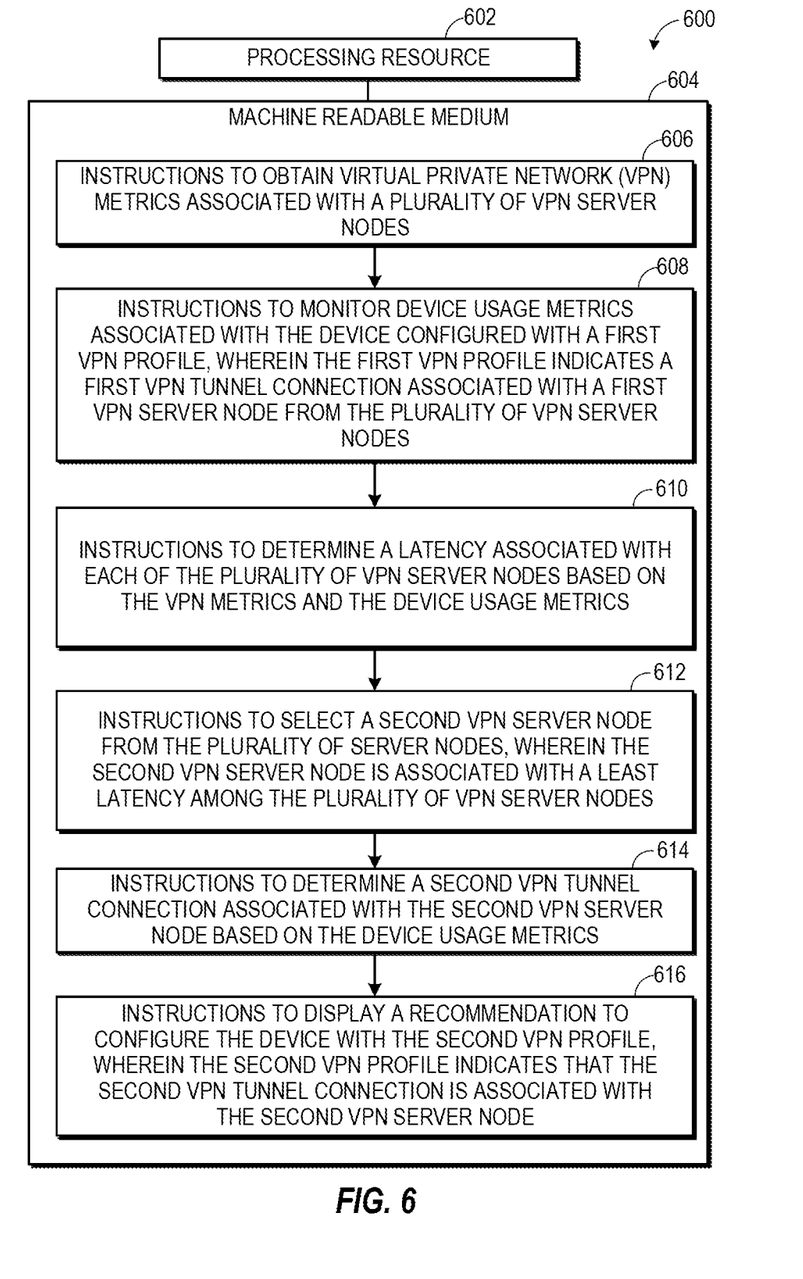
FIG. 6 is a block diagram depicting a processing resource and a machine-readable medium encoded with example instructions to select virtual private network profiles, in accordance with an example.

Moving to FIG. 6, a block diagram 600 depicting a processing resource 602 and a machine-readable medium 604 encoded with example instructions to facilitate select virtual private network profiles is presented, in accordance with an example. The machine-readable medium 604 may be non-transitory and is alternatively referred to as a non-transitory machine-readable medium 604. In some examples, the machine-readable medium 604 may be accessed by the processing resource 602. In some examples, the processing resource 602 may represent one example of the processing resource 210 of example device 202 of FIG. 2. Further, the machine-readable medium 604 may represent one example of the machine-readable medium 212 of example device 202.

The machine-readable medium 604 may be any electronic, magnetic, optical, or other physical storage device that may store data and/or executable instructions. Therefore, the machine-readable medium 604 may be, for example, RAM, an EEPROM, a storage drive, a flash memory, a CD-ROM, and the like. As described in detail herein, the machine-readable medium 604 may be encoded with executable instructions 606, 608, 610, 612, 614, and 616 (hereinafter collectively referred to as instructions 606-616) for performing the method 300 described in FIG. 3. Although not shown, in some examples, the machine-readable medium 604 may be encoded with certain additional executable instructions to perform the method 300 of FIG. 3, and/or any other operations performed by the device 202, without limiting the scope of the present disclosure.

The processing resource 602 may be a physical device, for example, one or more CPU, one or more semiconductor-based microprocessor, one or more GPU, ASIC, FPGA, other hardware devices capable of retrieving and executing the instructions 606-616 stored in the machine-readable medium 604, or combinations thereof. In some examples, the processing resource 602 may fetch, decode, and execute the instructions 606-616 stored in the machine-readable medium 604 to select virtual network profile at the client device. In certain examples, as an alternative or in addition to retrieving and executing the instructions 606-616, the processing resource 602 may include at least one IC, other control logic, other electronic circuits, or combinations thereof that include a number of electronic components for performing the functionalities intended to be performed by the device 202 of FIG. 2.

The instructions 606, when executed by the processing resource 602, may cause the processing resource 602 to obtain virtual private network metrics associated with a plurality of VPN server nodes. Further, the instructions 608 when executed by the processing resource 602 may cause the processing resource 602 to monitor device usage metrics associated with the device configured with a first VPN profile. The first VPN profile indicates that a first VPN tunnel connection is associated with a first VPN server node from the plurality of VPN server nodes. Furthermore, the instructions 610 when executed by the processing resource 602 may cause the processing resource 602 to determine a latency associated with each of the plurality of VPN server nodes based on the VPN metrics and the device usage metrics. Further, the instructions 612 when executed by the processing resource 602 may cause the processing resource 602 to select a second VPN server node associated with a least latency among the plurality of VPN server nodes. Moreover, the instructions 614 when executed by the processing resource 602 may cause the processing resource 602 to determine a second VPN tunnel connection associated with the second VPN server node based on the device usage metrics. Further, the instructions 614 when executed by the processing resource 602 may cause the processing resource 602 to display a recommendation to configure the device with the second VPN profile. The second VPN profile indicates that the second VPN tunnel connection is associated with the second VPN server node.

While certain implementations have been shown and described above, various changes in form and details may be made. For example, some features and/or functions that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

We claim:

1. A device comprising:
a processing resource;
a machine-readable medium storing instructions that, when executed by the processing resource, cause the processing resource to:
obtain virtual private network (VPN) metrics associated with a plurality of VPN server nodes;
monitor device usage metrics associated with the device configured with a first VPN profile, wherein the first VPN profile indicates that a first VPN tunnel connection is associated with a first VPN server node of the plurality of VPN server nodes;
determine a latency associated with each of the plurality of VPN server nodes based on the VPN metrics and the device usage metrics;
select a second VPN server node from the plurality of VPN server nodes, wherein the second VPN server node is associated with a least latency, high throughput, and low server load among the plurality of VPN server nodes;
determine a second VPN tunnel connection associated with the second VPN server node based on historical web traffic, tunnel connection traffic, and user specific metrics;
display, to the user, a recommendation to configure the device with one or more recommended VPN profiles for a determined period of time, wherein the recommended VPN profiles includes at least a second VPN profile, and wherein the second VPN profile indicates that the second VPN tunnel connection is associated with the second VPN server node; and
if the user does not select any of the recommended VPN profiles before the expiry of the determined period of time, then automatically switch the device's configuration from the first VPN profile to the second VPN profile.

2. The device of claim 1, wherein to automatically switch from the first VPN profile to the second VPN profile, the processing resource executes one or more of the instructions to:
disconnect from the first VPN server node and the first VPN tunnel connection; and
establish a connection with the second VPN server node and the second VPN tunnel connection.

3. The device of claim 1, wherein the VPN metrics include one or more of a roundtrip time, server load, bandwidth, routing hops, and geographical distance, number of disconnections, and wherein the device usage metrics include one or more of historical web traffic, tunnel connection traffic, user specific metrics, workload profiles, and device resources.

4. The device of claim 3, wherein to select the second VPN server node, the processing resource executes one or more of the instructions to:
provide the VPN metrics and the device usage metrics as an input to a machine learning model; and
predict a VPN server node associated with a least latency using the machine learning model.

5. The device of claim 1, wherein the processing resource executes one or more of the instructions to: identify a device profile of the device, wherein the device profile indicates whether the device is a greenfield device or a non-greenfield device.

6. The device of claim 1, wherein the processing resource executes one or more of the instructions to: disconnect a connection to the second VPN server node based on device inactivity.

7. The device of claim 1, further comprising: a display unit for displaying a user interface for rendering a plurality of options for selection, wherein the plurality of options indicate VPN profiles.

8. The device of claim 1, wherein the first VPN tunnel connection and the second VPN tunnel connection are one of a full VPN tunnel connection or a split VPN tunnel connection.

9. A method comprising:
obtaining, by a processor, virtual private network (VPN) metrics associated with a plurality of VPN server nodes;
monitoring, by the processor, device usage metrics associated with a device configured with a first VPN profile, wherein the first VPN profile indicates that a first VPN tunnel connection is associated with a first VPN server node of the plurality of VPN server nodes;
determining, by the processor, a latency associated with each of the plurality of VPN server nodes based on the VPN metrics and the device usage metrics
selecting, by the processor, a second VPN server node from the plurality of VPN server nodes, wherein the second VPN server node is associated with a least latency, high throughput, and low server load among the plurality of VPN server nodes;
determining, by the processor, a second VPN tunnel connection associated with the second VPN server node based on the historical web traffic, tunnel connection traffic, and user specific metrics;
displaying, by the processor to the user, a recommendation to configure the device with one or more recommended VPN profiles for a determined period of time, wherein the recommended VPN profiles includes at least a second VPN profile, and wherein the second VPN profile indicates that the second VPN tunnel connection is associated with the second VPN server node; and
if the user does not select any of the recommended VPN profiles before the expiry of the determined period of time, then automatically switch the device's configuration from the first VPN profile to the second VPN profile.

10. The method of claim 9, wherein selecting the second VPN server node comprises:
providing, by the processor, the VPN metrics and the device usage metrics as an input to a machine learning model; and
predicting, by the processor, a VPN server node associated with a least latency using the machine learning model.

11. The method of claim 10, wherein the machine learning model is trained using a supervised learning method or an unsupervised learning method.

12. The method of claim 9, further comprising: disconnecting a connection to the second VPN server node based on device inactivity.

13. The method of claim 9, wherein the first VPN tunnel connection and the second VPN tunnel connection are one of a full VPN tunnel connection or a split VPN tunnel connection.

14. A non-transitory machine-readable medium storing instructions executable by a processing resource, the instructions comprising:
instructions to obtain virtual private network (VPN) metrics associated with a plurality of VPN server nodes;
instructions to monitor device usage metrics associated with a device configured with a first VPN profile, wherein the first VPN profile indicates that a first VPN tunnel connection is associated with a first VPN server node of the plurality of VPN server nodes;
instructions to determine a latency associated with each of the plurality of VPN server nodes based on the VPN metrics and the device usage metrics;
instructions to select a second VPN server node from the plurality of VPN server nodes, wherein the second VPN server node is associated with a least latency, high throughput, and low server load among the plurality of VPN server nodes;
instructions to determine a second VPN tunnel connection associated with the second VPN server node based on historical web traffic, tunnel connection traffic, and user specific metrics;
instructions to display a recommendation to the user for a determined period of time to configure the device with one or more recommended VPN profiles, wherein the recommended VPN profiles includes at least a second VPN profile, and wherein the second VPN profile indicates that the second VPN tunnel connection is associated with the second VPN server node; and
instructions to, if the user does not select any of the recommended VPN before the expiry of the determined period of time, automatically switch the device's configuration from the first VPN profile to the second VPN profile.

15. The non-transitory machine-readable medium of claim 14, wherein the instructions to select the second VPN server node further comprising instructions to:
provide the VPN metrics and the device usage metrics as an input to a machine learning model; and
predict a VPN server node associated with a least latency using the machine learning model.

16. The non-transitory machine-readable medium of claim 14, further comprising instructions to: identify a device profile of the device, wherein the device profile indicates whether the device is a greenfield device or a non-greenfield device.

17. The non-transitory machine-readable medium of claim 14, further comprising instructions to: disconnect a connection to the second VPN server node based on device inactivity.

18. The device of claim 1, wherein the processing resource executes one or more of the instructions to determine if the device is a new device for the VPN.

19. The device of claim 1, wherein the processing resource executes one or more of the instructions to disconnect a connection to the VPN if the device is inactive.

20. The device of claim 19, wherein disconnecting the connection to the VPN comprises disconnecting a VPN tunnel connection and preserving a connection to the VPN server.

\* \* \* \* \*